US010315278B2

(12) United States Patent
Wang et al.

(10) Patent No.: US 10,315,278 B2
(45) Date of Patent: Jun. 11, 2019

(54) ADJUSTABLE CLAMP USED FOR MARINE DECK WELDING TEST

(71) Applicant: Jiangsu University, Zhenjiang (CN)

(72) Inventors: Yun Wang, Zhenjiang (CN); Jinxing Du, Zhenjiang (CN); Yun Bai, Zhenjiang (CN); Hao Yu, Zhenjiang (CN); Zhenying Xu, Zhenjiang (CN); Sumin Yin, Zhenjiang (CN); Xuepeng Wang, Zhenjiang (CN)

(73) Assignee: Jiangsu University, Jiangsu (CN)

( * ) Notice: Subject to any disclaimer, the term of this patent is extended or adjusted under 35 U.S.C. 154(b) by 141 days.

(21) Appl. No.: 15/545,173

(22) PCT Filed: Apr. 30, 2015

(86) PCT No.: PCT/CN2015/077901
§ 371 (c)(1),
(2) Date: Jul. 20, 2017

(87) PCT Pub. No.: WO2016/145724
PCT Pub. Date: Sep. 22, 2016

(65) Prior Publication Data
US 2018/0009066 A1    Jan. 11, 2018

(30) Foreign Application Priority Data

Mar. 19, 2015   (CN) .......................... 2015 1 0124636

(51) Int. Cl.
*B23K 37/04*   (2006.01)

(52) U.S. Cl.
CPC ................. *B23K 37/0435* (2013.01)

(58) Field of Classification Search
CPC ...... B23K 37/04–0452; B23K 37/0408; B23K 37/0426; B23K 37/0435; B23K 37/0443;
(Continued)

(56) References Cited

U.S. PATENT DOCUMENTS 1,463,882 A * 8/1923 Fuller .................. B25H 1/0007
 104/32.1
1,469,734 A * 10/1923 Staley .................. B25H 1/0007
 269/296
(Continued)

FOREIGN PATENT DOCUMENTS

BG            110655 A    11/2011
CN       101551289 A    10/2009
(Continued)

*Primary Examiner* — Tyrone V Hall, Jr.
(74) *Attorney, Agent, or Firm* — Greenberg Traurig, LLP

(57) ABSTRACT

An adjustable clamp used for a marine deck welding test includes a supporting device, a guiding and positioning device and a clamping device; the guiding and positioning device comprises a plurality of guiding shafts, a plurality of guiding plates and a plurality of positioning rods, the guiding shafts located at the two sides of a working platform are detachably connected with supporting blocks, the guiding shafts penetrate through the guiding plates, the guiding plates can slide horizontally along the guiding shafts, at least one column of through-holes are formed in each guiding plate in the direction perpendicular to the sliding direction, the through-holes located at the central part are guiding plate bolt holes, the through-holes located at the two sides are guiding plate positioning holes, the positioning rods are placed in the guiding plate positioning holes, and the upper ends of the positioning rods are higher than the guiding plates; the clamping device comprises a plurality of pressing plates located on the upper parts of the guiding plates and provided with pressing plate bolt holes corresponding to the guiding plate bolt holes, and the pressing plates are connected with the guiding plates via bolts. The clamp provided in the present invention has advantages including simple structure, easy operation, low cost, accurate positioning, and the positioning points and the clamping force can be adjusted at will.

12 Claims, 4 Drawing Sheets

(58) Field of Classification Search
CPC ........... B25B 11/02; B25B 5/145; B25H 1/00; B25H 1/0007
See application file for complete search history.

(56) References Cited

U.S. PATENT DOCUMENTS

| | | | | |
|---|---|---|---|---|
| 1,481,503 A | * | 1/1924 | Carswell | B25H 1/0007 248/172 |
| 1,792,612 A | * | 2/1931 | Staley | B25H 1/0007 248/185.1 |
| 2,188,433 A | * | 1/1940 | Friese | B23Q 3/00 269/242 |
| 2,828,931 A | * | 4/1958 | Harvey | B65D 19/0095 108/54.1 |
| 3,815,890 A | * | 6/1974 | Urban | B23K 37/0443 269/296 |
| 4,717,131 A | * | 1/1988 | Dugas | B23K 37/0435 267/41 |
| 4,763,521 A | | 8/1988 | Goodwin et al. | |
| 4,934,720 A | * | 6/1990 | Dobron | B62B 5/0083 108/56.1 |

FOREIGN PATENT DOCUMENTS

| | | |
|---|---|---|
| CN | 203471187 U | 3/2014 |
| CN | 104400244 A | 3/2015 |
| KR | 1019830002648 B1 | 12/1983 |

* cited by examiner

ADJUSTABLE CLAMP USED FOR MARINE DECK WELDING TEST

CROSS REFERENCE TO RELATED APPLICATION

This application is a non-provisional application claiming priority from International Application No. PCT/CN/2015/077901, filed on Apr. 30, 2015, which claims priority to Chinese Patent Application No. 201510124636.1, filed on Mar. 19, 2015, each of which are incorporated herein by reference in their entirety.

FIELD OF THE DISCLOSURE

The invention relates to an adjustable clamp used for a marine deck welding test, and belongs to the technical field of welding equipment.

BACKGROUND OF RELATED ART

In the traditional welding technical field, the temperature at the welding point increases rapidly in the welding process, and the post-welding temperature decreases rapidly as the welding point moves. Under the impact of temperature difference, a complex stress-strain state occurs in the weldment, high residual tension stress is produced at the weld seam, and the residual tension stress decreases as the distance from the weld seam increases. Owing to the existence of the complex and uneven stress-strain in the weldment, high warping deformation may be produced in the weldment after the weldment is cooled down. Welding clamps are indispensable auxiliary tools for welding of metal structures and an important constituent of the welding process. In the existing technology, usually reversed deformation method, skip-welding method, and weld seam hammering method, etc., are utilized to reduce the degree of post-welding deformation. Though these methods can reduce post-welding deformation to some degree, the post-welding deformation reduction effect is not ideal; the clamps and positioning devices used at present studying weld seam quality and post-welding performance of weldment are often very complex and costly, and cannot meet the requirement for adjusting positioning point and clamping force at will.

For example, Chinese Patent Application Document No. CN102601566A discloses a swing-type reversed deformation welding clamp for bridge board unit; however, the drawbacks of the welding clamp include: it requires multiple hydraulic cylinders for driving purpose, has complex composition, and involves high manufacturing cost.

For example, Chinese Patent Application Document No. CN103317279A discloses a multi-functional welding test clamp; however, the drawbacks of the clamp include: the weldment is at an suspending state, the clamp cannot be used to hold large-size plate parts, the clamping position of the weldment can't be selected at will, and high clamping force cannot be applied.

Therefore, it is of crucial importance to carry out research on the welding quality of a weldment clamped at different clamping positions and at different clamping levels, so as to find out optimal welding parameters and thereby improve the performance of the weldment.

SUMMARY

In view of the above-mentioned, the object of the present invention is to provide an adjustable clamp for marine deck welding test, to overcome the technical drawbacks in the clamps and positioning devices used in the prior art, including complex structure, high cost, and the positioning point and the clamping force cannot be adjusted at will.

To solve the problem described above, the present invention employs the following technical scheme:

An adjustable clamp for marine deck welding test, comprising a supporting device, a guiding and positioning device, and a clamping device;

the supporting device comprises a working platform and at least four supporting blocks located at the corners of the working platform, with the bottom surfaces of the supporting blocks fixedly connected to the top surface of the working platform;

the guiding and positioning device comprises a plurality of guiding shafts, a plurality of guiding plates, and a plurality of positioning rods, the guiding shafts are located at the two sides of the working platform and are detachably connected with the supporting blocks, all of the guiding shafts penetrate through the guiding plates, the guiding plates can slide horizontally along the guiding shafts, at least one column of through-holes are arranged on the guiding plate in the direction perpendicular to the sliding direction, the through-holes located at the central part are guiding plate bolt holes, while the through-holes located at the two sides are guiding plate positioning holes, the positioning rods are placed in the guiding plate positioning holes and the upper ends of the positioning rods are higher than the guiding plates;

the clamping device comprises a plurality of pressing plates located on the upper parts of the guiding plates and provided with pressing plate bolt holes corresponding to the guiding plate bolt holes, and the pressing plates are fixedly connected with the guiding plates via bolts mounted in the guiding plate bolt holes and the pressing plate bolt holes.

As a further improvement to the present invention, the supporting blocks are in a quantity of four and are located at the four corners of the working platform respectively, and the upper part of each of the supporting blocks is a U-groove; the central part of the guiding shaft is a plain shaft, and the two ends of the guiding shaft have threads and are connected with a nut respectively; the guiding shafts are in clearance fit with the U-grooves of the supporting blocks, can move along the U-grooves in the vertical direction, and can be fixedly connected to the supporting blocks via the nuts on the two ends.

As a further improvement to the present invention, the width W of the U-groove of the supporting block and the nominal diameter d1 of the threads on the two ends of the guiding shaft meet the following relational expression: $W=(1.05\sim1.1)\times d1$.

As a further improvement to the present invention, the supporting blocks are in a quantity of four and are located at the four corners of the working platform respectively; each of the supporting blocks has a plurality of guiding shaft positioning holes in the vertical direction, and the two ends of each of the guiding shafts can be located at different positions on the supporting block via the guiding shaft positioning holes.

As a further improvement of the present invention, the guiding shafts, guiding plates, and pressing plates are in a quantity of two respectively; each of the guiding plates has a column of through-holes in the direction perpendicular to the sliding direction, and the guiding plate positioning holes are symmetrically distributed in relation to the guiding plate bolt hole; the upper part of each of the guiding plates is connected with a pressing plate; the positioning rods are in a quantity of two, and are located symmetrically in the guiding plate positioning holes and the pressing plate positioning holes.

As a further improvement of the present invention, the pressing plate has a plurality of pressing plate positioning holes corresponding to the guiding plate positioning holes, and the diameter of the pressing plate positioning holes is smaller than the diameter of the guiding plate positioning holes; the upper ends of the positioning rods have same diameter as the diameter of pressing plate positioning holes, the lower ends of the positioning rods have same diameter as the guiding plate positioning holes, and the positioning rods are located in the corresponding guiding plate positioning holes and the pressing plate positioning holes.

As a further improvement of the present invention, the guiding shafts and the guiding plates are in a quantity of two respectively, and the pressing plates are in a quantity of four; each of the guiding plates has two columns of through-holes parallel to each other in the direction perpendicular to the sliding direction; the guiding plate positioning holes are symmetrically distributed in relation to the guiding plate bolt hole; each of the guiding plates corresponds to three positioning rods, which are placed in the guiding plate positioning holes and the pressing plate positioning holes in a triangular distribution layout; the upper part of each column of through-holes has a corresponding pressing plate, the upper parts of two pressing plates at one side of the same guiding plate are connected with a transverse plate, and the transverse plate has transverse plate bolt holes corresponding to the pressing plate bolt holes; the transverse plate, the pressing plates, and the guiding plate are connected by bolts.

As a further improvement of the present invention, center of the guiding plate has a guiding plate center hole; center of the transverse plate has a transverse plate center hole corresponding to the guiding plate center hole; the transverse plate, the pressing plates, and the guiding plate are connected by bolts mounted in the guiding plate center hole and the transverse plate center hole.

As a further improvement of the present invention, the pressing plate has pressing plate positioning holes corresponding to the guiding plate positioning holes, and the diameter of the pressing plate positioning holes is smaller than the diameter of the guiding plate positioning holes; the upper ends of the positioning rods have same diameter as the diameter of pressing plate positioning holes, and the lower ends of the positioning rods have same diameter as the diameter of guiding plate positioning holes.

As a further improvement of the present invention, the distance H from the bottom surfaces of the guiding plates to the top surface of the working platform is $H=(6.5\sim7.5)\times h$, where, h is the thickness of the deck.

It can be seen from the description of the technical scheme in the present invention: the present invention can achieve the following beneficial effects:

(1) Since the guiding shafts, guiding plates, and positioning rods are fitted and connected together, the adjustable clamp for marine deck welding test provided in the present invention meets the requirement for selecting a positioning point at will, and achieves accurate positioning; (2) since the pressing plates, guiding plates and bolts are fitted and connected together, the adjustable clamp for marine deck welding test provided in the present invention meets the requirement for selecting the clamping force at will; (3) since the working platform, supporting blocks, guiding shafts, guiding plates, positioning rods, nuts, bolts and pressing plates are fitted and connected to assemble the clamp, the adjustable clamp for marine deck welding test provided in the present invention has advantages over traditional clamps in the art, including simple structure, easy operation, and low cost; (4) since the upper part of each deck has guiding plates, positioning rods, and pressing plates, etc., the adjustable clamp for marine deck welding test provided in the present invention can be used for welding performance comparison test for marine deck at different positioning points and at different levels of clamping force.

BRIEF DESCRIPTION OF THE DRAWINGS

Hereunder the present invention will be further detailed in embodiment with reference to the accompanying drawings, to make above-mentioned object, characteristics, and technical features of the present invention can be understood more clearly. Among the figures.

Figure 1:
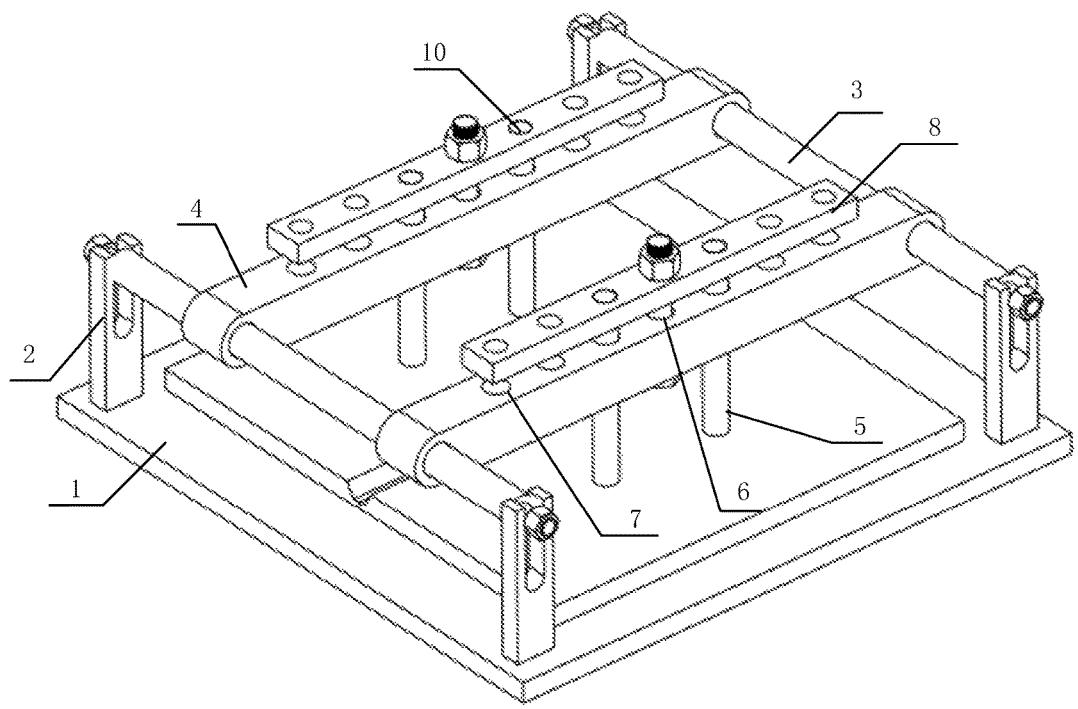
FIG. 1 is a schematic structural diagram of the adjustable clamp for marine deck welding test in embodiment 1 of the present invention.

In the figures: 1—working platform; 2—supporting block; 3—guiding shaft; 4—guiding plate; 5—positioning rod; 6—guiding plate bolt hole; 7—guiding plate positioning hole; 8—pressing plate; 9—pressing plate bolt hole; 10—pressing plate positioning hole; 11—guiding shaft positioning hole; 12—transverse plate; 13—transverse plate bolt hole; 14—transverse plate center hole.

DETAILED DESCRIPTION

Hereunder the technical scheme of the present invention will be described clearly and completely in the embodiments with reference to the accompanying drawings.

In the description of the present invention, it should be appreciated that the orientation or position relations indicated by terms "above", "below", "front", "back", "left", "right", "top", "bottom", "inside", or "outside", etc., are based on the orientation or position relations indicated on the accompanying drawings. They are used only to describe and simplify the description of the present invention, instead of indicating or implying that the involved device or component must have a specific orientation or must be constructed and operated in a specific orientation. Therefore, the use of these terms shall not be deemed as constituting any limitation to the present invention.

In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprises one or more such features. In the description of the present invention, "a plurality of" or "multiple" indicates two or more, unless otherwise specified explicitly.

In the present invention, unless otherwise specified and defined explicitly, the terms "install", "link", "connect", "fix", etc. shall be interpreted in their broad meaning, for example, the connection can be fixed connection, detachable connection, or integral connection; can be mechanical connection or electrical connection; can be direct connection or indirect connection via an intermediate medium, or internal communication between two elements. Those having ordinary skills in the art can interpret the specific meanings of the terms in the present invention according to the context.

In the present invention, unless otherwise specified and defined explicitly, a first feature "above" or "below" a second feature may comprise direct contact between the first feature and the second feature, or indirect contact between them via another feature. In addition, a first feature is "above", "over" or "on" a second feature may comprise that the first feature is right above or diagonally above the second feature, or may only represents that the elevation of the first feature is higher than that of the second feature. A first feature is "below" "subjacent" or "under" a second feature may comprise that the first feature is right below or diagonally below the second feature, or may only represents that the elevation of the first feature is lower than that of the second feature.

The design purpose of the present invention is to provide an adjustable clamp for marine deck welding test, which has advantages including simple structure, easy operation, accurate positioning, low cost, and the positioning point and clamping force are adjustable at will, etc., and the clamp can meet the requirement for synchronous welding performance comparison test for marine deck at different positioning points at different levels of pressing force.

Embodiment 1

As shown in FIG. 1, the adjustable clamp for marine deck welding test comprises a supporting device, a guiding and positioning device, and a clamping device, wherein, the supporting device comprises a working platform 1 and four supporting blocks 2 located at the four corners of the working platform 1, with the bottom surfaces of the supporting blocks 2 connected with the top surface of the working platform 1 by threads.

Figure 2:
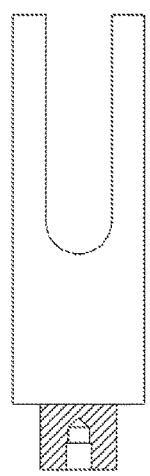
FIG. 2 is a schematic diagram of the supporting blocks in embodiment 1 of the present invention.

The guiding and positioning device comprises two guiding shafts 3, two guiding plates 4, and four positioning rods 5. As shown in FIG. 2, the two ends of each of the two guiding shafts 3 are connected with the corresponding supporting blocks 2; the upper part of the supporting block 2 is a U-groove; the central part of the guiding shaft 3 is a plain shaft, and the two ends of the guiding shaft 3 have threads and are connected with nuts; the guiding shaft 3 clearance fit with the U-groove of the supporting block 2, the guiding shaft 3 can move along the U-groove in a vertical direction and can be fixedly connected to the supporting block 2 via the nuts; wherein, the width W of the U-groove of the supporting block 2 and the nominal diameter d1 of the threads on the two ends of the guiding shaft 3 meet the following relational expression: $W=(1.05\sim1.1)\times d1$.

Figure 3:
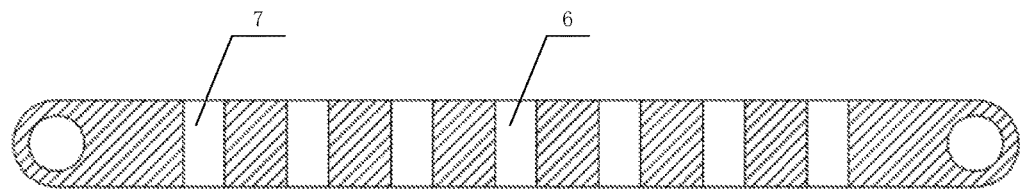
FIG. 3 is a schematic diagram of the guiding plates in embodiment 1 of the present invention.

All of the guiding shafts 3 penetrate through the two ends of the guiding plates 4; the guiding plate 4 can slide horizontally along the guiding shaft 3, the distance H from the bottom surface of the guiding plate 4 to the top surface of the working platform 1 is $H=(6.5\sim7.5)\times h$; as shown in FIG. 3, the guiding plate 4 has one guiding plate bolt hole 6 and a plurality of guiding plate positioning holes 7, the guiding plate bolt hole 6 is located at the center of the guiding plate 4, the guiding plate positioning holes 7 and the guiding plate bolt hole 6 are in the same line, and the guiding plate positioning holes 7 are symmetric to the guiding plate bolt hole 6.

Figure 4:
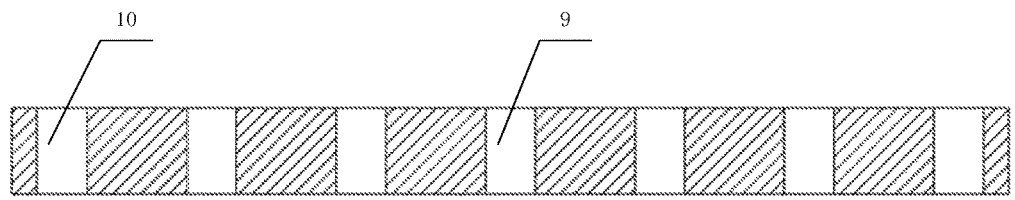
FIG. 4 is a schematic diagram of the pressing plates in embodiment 1 of the present invention.

The clamping device comprises two pressing plates 8, the upper part of each guiding plate 4 is arranged with a pressing plate 8 accordingly; as shown in FIG. 4, the pressing plate 8 has pressing plate bolt holes 9 and pressing plate positioning holes 10 corresponding to the guiding plate bolt hole 6 and the guiding plate positioning holes 7 respectively; a bolt is fitted in the guiding plate bolt hole 6 and the pressing plate bolt hole 9, and positioning rods 5 are arranged in the guiding plate positioning holes 7 and the pressing plate positioning holes 10; the pressing plate 8 and the guiding plate 4 exert a pressing action on the positioning rods 5 by virtue of bolt fastening. Preferably, the lower part of each guiding plate 4 is provided with two positioning rods 5, the diameter of the lower end of each positioning rod 5 is greater than the diameter of the upper end, the diameter of the lower end is the same as the diameter of the guiding plate positioning hole 7, and the diameter of the upper end is the same as the diameter of the pressing plate positioning hole 10, so as to achieve stable positioning.

The operating process is: first, the four supporting blocks 2 are connected to the working platform 1 by screws; then, the guiding shaft 3 is inserted into the two ends of the guiding plate 4, the two ends of the guiding shaft 3 are placed on the U-groove of the corresponding supporting block 2; the nuts on the two ends of the guiding shaft 3 is adjusted, and the position of the guiding shaft 3 in the U-groove of the supporting block 2 is adjusted, according to the thickness h of the first deck and the second deck, so that the distance H from the bottom surface of the guiding plate 4 to the top surface of the working platform 1 is $H=(6.5\sim7.5)\times h$; here, the thickness h of the first deck and the second deck is $h=3$ cm; thus, the distance from the bottom surface of the guiding plate 4 to the top surface of the working platform 1 is $H=(6.5\sim7.5)\times h$, here, suppose $H=7\times h=21$ cm; the nuts on the two ends of the guiding shaft 3 are tightened up, so that the guiding shaft 3 is fixed to the two supporting blocks 2 under specific clamping force; the first deck and the second deck to be welded are laid on the working platform sequentially, so that the center line of the weld seam superposes the center line of the working platform 1; now, the positions of the guiding plates 4 are adjusted, so that the guiding plates 4 are symmetric in relation to the center line of the weld seam; two positioning rods 5 are inserted symmetrically in the guiding plate positioning holes 7 and the pressing plate positioning holes 10, and then a bolt is inserted in the guiding plate bolt hole 6 and the pressing plate bolt hole 9; the nut on the bolt is screwed tightly with a digital display torque wrench, so that the guiding plates 4 are pressed and thereby the positioning rods 5 are pressed; after tightened up, the positioning rods 5 that contact with the first deck and the second deck produce pressing force F at their ends, $F=V/(K\times D)$, where, V is the reading on the digital display torque wrench, K is the torque coefficient of the bolt, and D is the nominal diameter of the bolt; after the welding is completed, a welding test can be carried out at different levels of clamping force simply by changing the pressing force F; a welding test can be carried out at different positioning points by changing the positions of the guiding plates 4 on the guiding shafts 3 and the positions of the positioning rods 5 in the guiding plate positioning holes 7 and pressing plate positioning holes 10; then, optimal welding parameters are determined.

Embodiment 2

Figure 5:
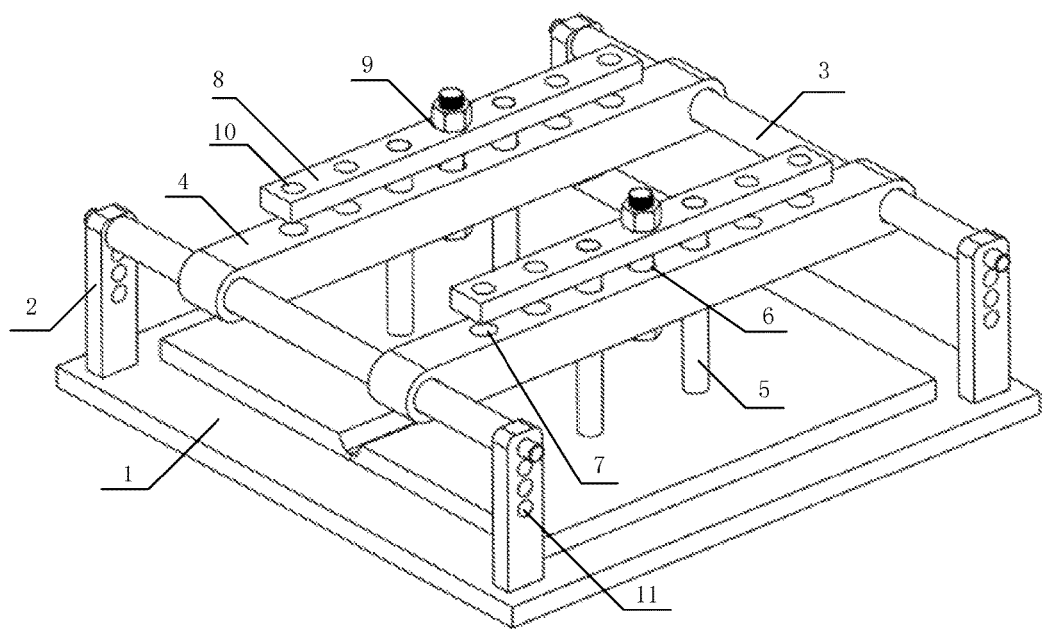
FIG. 5 is a schematic structural diagram of the adjustable clamp for marine deck welding test in embodiment 2 of the present invention.

As shown in FIG. 5, an adjustable clamp for marine deck welding test comprises a supporting device, a guiding and positioning device, and a clamping device, wherein, the supporting device comprises a working platform 1 and four supporting blocks 2 located at the four corners of the working platform 1, with the bottom surfaces of the supporting blocks 2 connected with the top surface of the working platform 1 by threads.

The guiding and positioning device comprises a plurality of guiding shafts 3, a plurality of guiding plates 4, and a plurality of positioning rods 5. As shown in FIG. 4, the supporting block 2 has a plurality of guiding shaft positioning holes 11 in the vertical direction, and the two ends of the guiding shaft 3 can be fixedly connected with the supporting block 2 via the guiding shaft positioning holes 11; the guiding shaft 3 can move and can be fixed in the vertical direction via the guiding shaft positioning holes 11; thus, the adjustment and positioning of the guiding shaft 3 in the vertical direction can be realized more easily, simply by inserting the two ends of the guiding shaft 3 into the corresponding guiding shaft positioning holes 11; in addition, the guiding shaft 3 can withstand higher pressure. The diameter of the lower end of each positioning rod 5 is greater than the diameter of the upper end, and the diameter of the lower end is the same as the diameter of the guiding plate positioning hole 7; the diameter of the upper end of the positioning rod 5 is the same as the diameter of the pressing plate positioning hole 10.

Each of the guiding shaft 3 penetrates through the two ends of the guiding plate 4; the guiding plate 4 can slide horizontally along the guiding shaft 3; the guiding plate 4 has one guiding plate bolt hole 6 and a plurality of guiding plate positioning holes 7, wherein, the guiding plate bolt hole 6 is located at the center of the guiding plate 4, the guiding plate positioning holes 7 and the guiding plate bolt hole 6 are in the same line, and the guiding plate positioning holes 7 are symmetric in relation to the guiding plate bolt hole 6.

The clamping device comprises two pressing plates 8 located on the upper part of the guiding plate 4, and the pressing plate 8 has a pressing plate bolt hole 9 and pressing plate positioning holes 10 corresponding to the guiding plate bolt hole 6 and guiding plate positioning holes 7 respectively; a bolt is fitted in the guiding plate bolt hole 6 and the pressing plate bolt hole 9, and a positioning rod 5 is fitted in the guiding plate positioning hole 7 and the pressing plate positioning hole 10; the diameter of the lower end of each positioning rod 5 is greater than the diameter of the upper end, and the diameter of the lower end is the same as the diameter of the guiding plate positioning hole 7; the diameter of the upper end of the positioning rod 5 is the same as the diameter of the pressing plate positioning hole 10; the pressing plate 8 and the guiding plate 4 exert a pressing action on the positioning rod 5 by virtue of bolt fastening.

The operating process is: first, the four supporting blocks 2 are connected to the working platform 1 by screws; then, the guiding shaft 3 is inserted into the two ends of the guiding plate 4, the two ends of the guiding shaft 3 are placed in the guiding shaft positioning hole 11 of the corresponding supporting block 2 according to the thickness of a first deck and a second deck; the first deck and the second deck to be welded are laid on the working platform sequentially, so that the center line of the weld seam superposes the center line of the working platform 1; now, the positions of the guiding plates 4 are adjusted, so that the guiding plates 4 are symmetric in relation to the center line of the weld seam; two positioning rods 5 are inserted symmetrically in the guiding plate positioning holes 7 and the pressing plate positioning holes 10, and then a bolt is inserted in the guiding plate bolt hole 6 and the pressing plate bolt hole 9; the nut on the bolt is screwed tightly with a digital display torque wrench, so that the guiding plates 4 are pressed and thereby the positioning rods 5 are pressed; after tightened up, the positioning rods 5 that contact with the first deck and the second deck produce pressing force F at their ends, $F=V/(K \times D)$, where, V is the reading on the digital display torque wrench, K is the torque coefficient of the bolt, and D is the nominal diameter of the bolt; after the welding is completed, a welding test can be carried out at different levels of clamping force simply by changing the pressing force F; a welding test can be carried out at different positioning points by changing the positions of the guiding plates 4 on the guiding shafts 3 and the positions of the positioning rods 5 in the guiding plate positioning holes 7 and pressing plate positioning holes 10; then, optimal welding parameters are determined.

Embodiment 3

Figure 6:
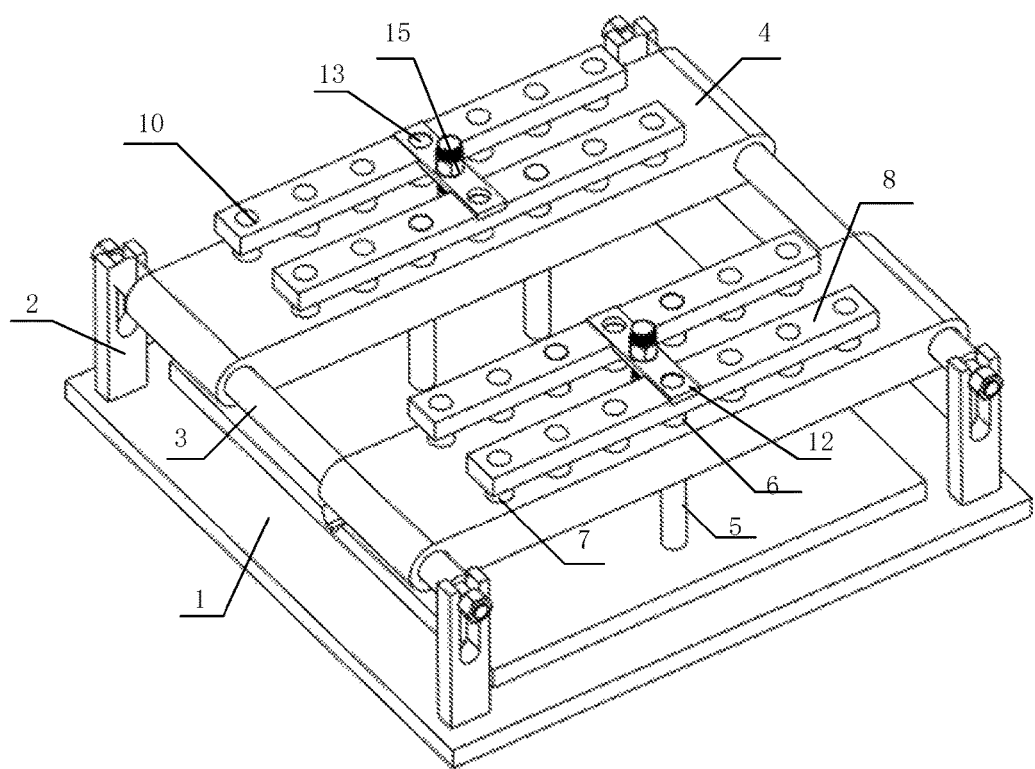
FIG. 6 is a schematic structural diagram of the adjustable clamp for marine deck welding test in embodiment 3 of the present invention.

As shown in FIG. 6, an adjustable clamp for marine deck welding test comprises a supporting device, a guiding and positioning device, and a clamping device, wherein, the supporting device comprises a working platform 1 and four supporting blocks 2 located at the four corners of the working platform 1, with the bottom surfaces of the supporting blocks 2 connected with the top surface of the working platform 1 by bolts.

The guiding and positioning device comprises two guiding shafts 3, two guiding plates 4, and six positioning rods 5. As shown in FIG. 2, the two ends of each of the two guiding shafts 3 are connected with the corresponding supporting blocks 2; the upper part of the supporting block 2 is a U-groove; the central part of the guiding shaft 3 is a plain shaft, and the two ends of the guiding shaft 3 have threads and are connected with nuts; the guiding shaft 3 clearance fit with the U-groove of the supporting block 2, the guiding shaft 3 can move along the U-groove in a vertical direction and can be fixedly connected to the supporting block 2 via the nuts; wherein, the width W of the U-groove of the supporting block 2 and the nominal diameter d1 of the threads on the two ends of the guiding shaft 3 meet the following relational expression: $W=(1.05 \sim 1.1) \times d1$. The diameter of the lower end of each positioning rod 5 is greater than the diameter of the upper end, and the diameter of the lower end is the same as the diameter of the guiding plate positioning hole 7; the diameter of the upper end of the positioning rod 5 is the same as the diameter of the pressing plate positioning hole 10.

Figure 7:
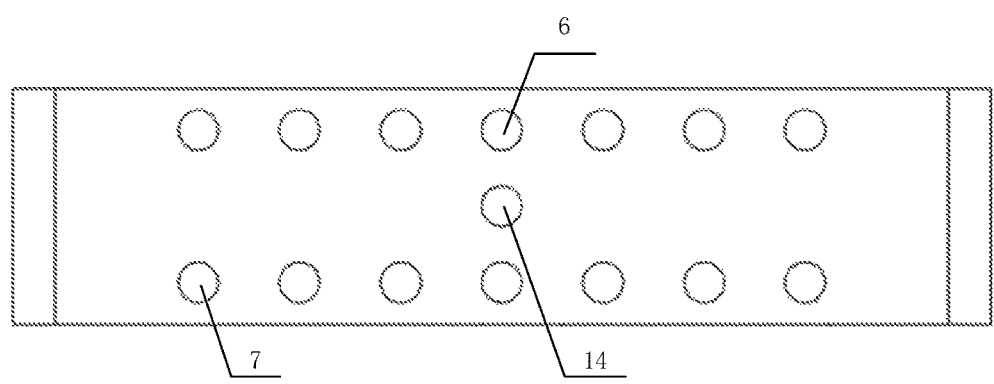
FIG. 7 is a schematic diagram of the guiding plates in embodiment 3 of the present invention.
Figure 8:
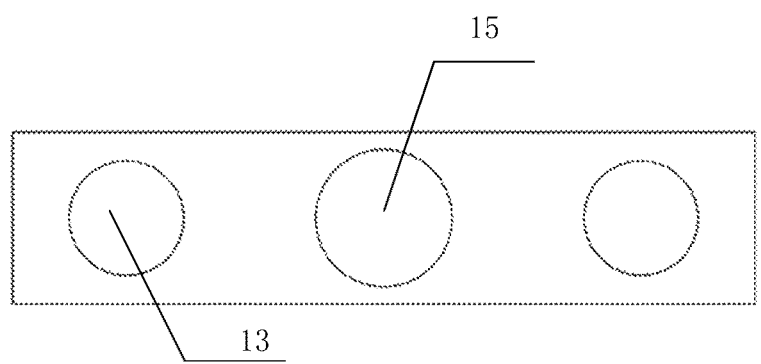
FIG. 8 is a schematic diagram of the transverse plates in embodiment 3 of the present invention.

The guiding shafts 3 are inserted into the two ends of the guiding plates 4; the guiding plates 4 can slide horizontally along the guiding shafts 3. As shown in FIG. 7, the guiding plate 4 has two columns of through-holes that are parallel to each other, and has a guiding plate center hole 14 at the center of the guiding plate 4. A pressing plate 8 is arranged above each column of through-holes, and the pressing plate 8 has a column of pressing plate positioning holes 10 corresponding to the guiding plate positioning holes 7 thereon; a transverse plate 12 is arranged above the two pressing plates 8 at one side of the same guiding plate 4; as shown in FIG. 8, the transverse plate 12 has a transverse plate bolt hole 15 corresponding to the guiding plate center hole 14, and the transverse plate 12 is connected with the guiding plate 4 by bolt; every three positioning rods 5 are located in corresponding guiding plate positioning holes 7 and pressing plate positioning holes 10, forming a "triangle shape", so that the deck can be positioned more reliably during welding, the deck welding quality can be ensured in a better way; in addition, with this technical scheme, the quantity and the distribution of the positioning rods can be selected at will, and the adaptability to the deck positioning and clamping force can be improved.

The operating process is: first, the four supporting blocks 2 are connected to the working platform 1 by screws; then, the guiding shaft 3 is inserted into the two ends of the guiding plate 4, the two ends of the guiding shaft 3 are placed on the U-groove of the corresponding supporting block 2; the nuts on the two ends of the guiding shaft 3 is adjusted, and the position of the guiding shaft 3 in the U-groove of the supporting block 2 is adjusted, according to the thickness h of the first deck and the second deck, so that the distance H from the bottom surface of the guiding plate 4 to the top surface of the working platform 1 is $H=(6.5\sim7.5)\times h$; here, the thickness h of the first deck and the second deck is h=3 cm; thus, the distance from the bottom surface of the guiding plate 4 to the top surface of the working platform 1 is $H=(6.5\sim7.5)\times h$, here, suppose $H=7\times h=21$ cm; the nuts on the two ends of the guiding shaft 3 are tightened up, so that the guiding shaft 3 is fixed to the two supporting blocks 2 under specific clamping force; the first deck and the second deck to be welded are laid on the working platform sequentially, so that the center line of the weld seam superposes the center line of the working platform 1; now, the positions of the guiding plates 4 are adjusted, so that the guiding plates 4 are symmetric in relation to the center line of the weld seam; three positioning rods 5 are inserted into the guiding plate positioning holes 7 and the pressing plate positioning holes 10, so that they form a "triangle shape"; the pressing plates 8 are laid at correct positions respectively, a transverse plate 12 is placed above every two pressing plates 8, a bolt with an fitted nut is inserted into the transverse plate center hole 15 of the transverse plate 12 and guiding plate center hole 14, the nut on the bolt is screwed tightly with a digital display torque wrench, so that the pressing plate 8 and guiding plate 4 are pressed, and thereby the positioning rod 5 is pressed; after the nut is tightened up, the positioning rods 5 that contact with the first deck and the second deck produce pressing force F at their ends, $F=V/(K\times D)$, where, V is the reading on the digital display torque wrench, K is the torque coefficient of the bolt, and D is the nominal diameter of the bolt; after the welding is completed, a welding test can be carried out at different levels of clamping force simply by changing the pressing force F; a welding test can be carried out at different positioning points by changing the positions of the guiding plates 4 on the guiding shafts 3 and the positions of the three positioning rods 5 in the guiding plate positioning holes 7 and pressing plate positioning holes 10; then, optimal welding parameters are determined.

While the adjustable clamp for marine deck welding test provided in the present invention is described above in detail in some embodiments, it should be appreciated that these embodiments are only some preferred embodiments of the present invention and don not constitute any limitation to the present invention. However, any modification, equivalent replacement, or refinement to the embodiments without departing from the spirit and the principle of the present invention shall be deemed as falling into the protection scope of the present invention.

We claim:

1. An adjustable clamp for marine deck welding test, comprising:
   a supporting device;
   a guiding and positioning device; and
   a clamping device, wherein,
   the supporting device comprises:
      a working platform and at least four supporting blocks located at the corners of the working platform, with the bottom surfaces of the supporting blocks fixedly connected to the top surface of the working platform;
   the guiding and positioning device comprises:
      a plurality of guiding shafts, a plurality of guiding plates, and a plurality of positioning rods, the guiding shafts are located at the two sides of the working platform and are detachably connected with the supporting blocks, all of the guiding shafts penetrate through the guiding plates, the guiding plates can slide horizontally along the guiding shafts, at least one column of through-holes are arranged on each guiding plate in the direction perpendicular to the sliding direction, the through-holes located at the central part are guiding plate bolt holes, while the through-holes located at the two sides are guiding plate positioning holes, the positioning rods are placed in the guiding plate positioning holes and the upper ends of the positioning rods are higher than the guiding plates; and
   the clamping device comprises:
      a plurality of pressing plates located on the upper parts of the guiding plates and provided with pressing plate bolt holes corresponding to the guiding plate bolt holes, and the pressing plates are connected with the guiding plates via bolts mounted in the guiding plate bolt holes and the pressing plate bolt holes.

2. The adjustable clamp for marine deck welding test according to claim 1, wherein, the supporting blocks are in a quantity of four and are located at the four corners of the working platform respectively, and the upper part of each of the supporting blocks is a U-groove; the central part of the guiding shaft is a plain shaft, and the two ends of the guiding shaft have threads and are connected with a nut respectively; the guiding shafts clearance fit with the U-grooves of the supporting blocks, and can move along the U-grooves in the vertical direction, and can be fixed to the supporting blocks via the nuts on the two ends.

3. The adjustable clamp for marine deck welding test according to claim 2, wherein, the width (W) of the U-groove of the supporting block and the nominal diameter (d1) of the threads on the two ends of the guiding shaft meet the following relational expression: $W=(1.05\sim1.1)\times d1$.

4. The adjustable clamp for marine deck welding test according to claim 2, wherein, the guiding shafts, guiding plates, and pressing plates are in a quantity of two respectively; each of the guiding plates has a column of through-holes in the direction perpendicular to the sliding direction, and the guiding plate positioning holes are symmetrically distributed in relation to the guiding plate bolt hole; the upper part of each of the guiding plates is connected with a pressing plate; the positioning rods are in a quantity of two, and are located symmetrically in the guiding plate positioning holes and the pressing plate positioning holes.

5. The adjustable clamp for marine deck welding test according to claim 2, wherein, the guiding shafts and the guiding plates are in a quantity of two respectively, and the pressing plates are in a quantity of four;

each of the guiding plates has two columns of through-holes parallel to each other in the direction perpendicular to the sliding direction; the guiding plate positioning holes are symmetrically distributed in relation to the guiding plate bolt hole; each of the guiding plates corresponds to three positioning rods, which are placed in the guiding plate positioning holes and the pressing plate positioning holes in a triangular distribution layout; the upper part of each column of through-holes has a corresponding pressing plate, the upper parts of two pressing plates at one side of the same guiding plate are connected with a transverse plate, and the transverse plate has transverse plate bolt holes corresponding to the pressing plate bolt holes; the transverse plate, the pressing plates, and the guiding plate are connected by bolts.

6. The adjustable clamp for marine deck welding test according to claim 1, wherein, the supporting blocks are in a quantity of four and are located at the four corners of the working platform respectively, each of the supporting blocks has a plurality of guiding shaft positioning holes in the vertical direction, and the two ends of each of the guiding shafts are located at different positions on the supporting block via the guiding shaft positioning holes.

7. The adjustable clamp for marine deck welding test according to claim 6, wherein, the guiding shafts, guiding plates, and pressing plates are in a quantity of two respectively; each of the guiding plates has a column of through-holes in the direction perpendicular to the sliding direction, and the guiding plate positioning holes are symmetrically distributed in relation to the guiding plate bolt hole; the upper part of each of the guiding plates is connected with a pressing plate; the positioning rods are in a quantity of two, and are located symmetrically in the guiding plate positioning holes and the pressing plate positioning holes.

8. The adjustable clamp for marine deck welding test according to claim 7, wherein, the pressing plate has a plurality of pressing plate positioning holes corresponding to the guiding plate positioning holes, and the diameter of the pressing plate positioning holes is smaller than the diameter of the guiding plate positioning holes; the upper ends of the positioning rods have same diameter as the diameter of pressing plate positioning holes, the lower ends of the positioning rods have same diameter as the diameter of guiding plate positioning holes, and the positioning rods are located in the corresponding guiding plate positioning holes and the pressing plate positioning holes.

9. The adjustable clamp for marine deck welding test according to claim 6, wherein, the guiding shafts and the guiding plates are in a quantity of two respectively, and the pressing plates are in a quantity of four;

each of the guiding plates has two columns of through-holes parallel to each other in the direction perpendicular to the sliding direction; the guiding plate positioning holes are symmetrically distributed in relation to the guiding plate bolt hole; each of the guiding plates corresponds to three positioning rods, which are placed in the guiding plate positioning holes and the pressing plate positioning holes in a triangular distribution layout; the upper part of each column of through-holes has a corresponding pressing plate, the upper parts of two pressing plates at one side of the same guiding plate are connected with a transverse plate, and the transverse plate has transverse plate bolt holes corresponding to the pressing plate bolt holes; the transverse plate, the pressing plates, and the guiding plate are connected by bolts.

10. The adjustable clamp for marine deck welding test according to claim 9, wherein, center of the guiding plate has a guiding plate center hole; center of the transverse plate has a transverse plate center hole corresponding to the guiding plate center hole; the transverse plate, the pressing plates, and the guiding plate are fixedly connected by bolts mounted in the guiding plate center hole and the transverse plate center hole.

11. The adjustable clamp for marine deck welding test according to claim 9, wherein, the pressing plate has pressing plate positioning holes corresponding to the guiding plate positioning holes, and the diameter of the pressing plate positioning holes is smaller than the diameter of the guiding plate positioning holes; the upper ends of the positioning rods have same diameter as the diameter of pressing plate positioning holes, and the lower ends of the positioning rods have same diameter as the diameter of guiding plate positioning holes.

12. The adjustable clamp for marine deck welding test according to claim 1, wherein, the distance (H) from the bottom surfaces of the guiding plates to the top surface of the working platform (1) is $H=(6.5\sim7.5)\times h$, where, h is the thickness of the deck.

* * * * *